United States Patent
Blanch et al.

(10) Patent No.: US 6,842,400 B2
(45) Date of Patent: *Jan. 11, 2005

(54) ACOUSTIC LOGGING APPARATUS AND METHOD

(75) Inventors: Joakim O. Blanch, Houston, TX (US); Georgios L. Varsamis, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 253 days.

This patent is subject to a terminal disclaimer.

(21) Appl. No.: 10/025,528

(22) Filed: Dec. 18, 2001

(65) Prior Publication Data

US 2003/0206487 A1 Nov. 6, 2003

(51) Int. Cl.[7] ............................ G01V 1/40; G01V 1/44; G01V 1/48
(52) U.S. Cl. ............................ 367/30; 367/25; 702/11; 73/152.02
(58) Field of Search ............................. 367/30, 73, 25; 181/103, 102; 702/6, 14, 11; 73/152.02, 152.03

(56) References Cited

U.S. PATENT DOCUMENTS

| 4,367,541 A | 1/1983 | Seeman | 367/34 |
| RE31,222 E | 4/1983 | McCracken | 364/571 |

(List continued on next page.)

FOREIGN PATENT DOCUMENTS

EP    1 324075 A2 *  7/2003

OTHER PUBLICATIONS

Alan Brie et al., "New Directions in Sonic Logging"; Spring 1998, (pp. 40–55); Oilfield Review.
Batakrishna Mandal, "Shear wave Anistrophy from Single Dipose Source" (undated).
Chung Chang et al.; "Localized Maps of the Subsurface," (pp. 56–66) Spring 1998; Oilfield Review.
G. Brewton, "The Geology of the Skinner, Bartlesville and Miesner Sandstones in Well DM21A At Catoosa"; Amoco publication, Nov. 1996.
B. A. Auld, "Acoustic Fields and Waves in Solids", vol. I (pp. 68–423), A Wiley–Interscience Publication.
K. Koster et al., "Dipole Shear Anistrophy Logging", Amoco Publication SL3.7 (pp. 1139–1142).

(List continued on next page.)

Primary Examiner—Ian J. Lobo
(74) Attorney, Agent, or Firm—Conley Rose, P.C.; Mark E. Scott

(57) ABSTRACT

The specification discloses a system and related method for determining characteristics of earth formations traversed by a borehole. An acoustic transmitter mounted on a tool, whether that tool is a wireline tool or a logging-while-drilling tool, imparts acoustic energy into the formation, and a plurality of receivers spaced apart from the transmitter and from each other receive acoustic energy responsive to the transmitter firing. Portions, or all, of each received signal are used to estimate source signals using an assumed transfer function. Each of those estimated source signals are then compared in some way to determine an objective function. This process is repeated for multiple assumed transfer functions, and at multiple starting times within the received signals. By searching for minimas of a plot of the objective function, characteristics of the earth formation may be determined.

58 Claims, 3 Drawing Sheets

U.S. PATENT DOCUMENTS

| | | | |
|---|---|---|---|
| 4,594,691 A | | 6/1986 | Kimball et al. .............. 367/32 |
| 4,648,039 A | | 3/1987 | Devaney et al. |
| 4,718,027 A | | 1/1988 | Richardson et al. ........ 364/554 |
| 4,752,916 A | * | 6/1988 | Loewenthal ................ 367/24 |
| 4,789,969 A | | 12/1988 | Naville |
| 4,794,572 A | | 12/1988 | Sondergeld ................ 367/31 |
| 4,803,666 A | | 2/1989 | Alford |
| 4,817,061 A | | 3/1989 | Alford et al. |
| 4,888,743 A | | 12/1989 | Thomsen |
| 4,903,244 A | | 2/1990 | Alford |
| 4,933,913 A | | 6/1990 | Thomsen |
| 4,951,267 A | | 8/1990 | Chang et al. |
| 4,995,008 A | | 2/1991 | Hornbostel et al. |
| 5,027,332 A | | 6/1991 | Alford |
| 5,029,146 A | | 7/1991 | Alford |
| 5,081,611 A | | 1/1992 | Hornby ...................... 367/25 |
| 5,136,554 A | | 8/1992 | Thomsen et al. |
| 5,173,879 A | * | 12/1992 | Cung et al. .................. 367/46 |
| 5,193,077 A | * | 3/1993 | Weiglien et al. ............. 367/23 |
| 5,214,613 A | | 5/1993 | Esmersoy |
| 5,398,215 A | | 3/1995 | Sinha et al. |
| 5,541,890 A | | 7/1996 | Tang ........................... 367/34 |
| 5,587,965 A | * | 12/1996 | Dragoset et al. ............. 367/24 |
| 5,661,696 A | | 8/1997 | Kimball et al. .............. 367/31 |
| 5,712,829 A | | 1/1998 | Tang et al. .................. 367/75 |
| 5,740,124 A | | 4/1998 | Chunduru et al. ............ 367/73 |
| 5,835,452 A | | 11/1998 | Mueller et al. |
| 5,960,369 A | | 9/1999 | Samaroo ...................... 702/6 |
| 5,999,486 A | | 12/1999 | DeVault |
| 6,012,015 A | | 1/2000 | Tubel ........................... 702/6 |
| 6,061,633 A | | 5/2000 | Fukuhara et al. ............. 702/6 |
| 6,088,294 A | | 7/2000 | Leggett, III et al. ......... 367/25 |
| 6,098,021 A | | 8/2000 | Tang et al. |
| 6,188,961 B1 | | 2/2001 | Mandal |
| 6,449,560 B1 | | 9/2002 | Kimball |
| 6,526,354 B2 | | 2/2003 | Bose et al. |
| 2003/0061035 A1 | * | 3/2003 | Kadambe .................... 704/203 |
| 2003/0206488 A1 | * | 11/2003 | Blanch et al. ................ 367/38 |

OTHER PUBLICATIONS

"Faults and Faulting", EAS–A193 Class Notes, SLU (9 pp.).

"Seismic Waves and Earth's Interior", EAS–A193 Class Notes, SLU (13 pp.).

Dr. Daniel A. Ruselle, "Sound Fields Radiated by Simple Sources", Kettering University (4 pp.).

N. Cheng et al., Borehole Geophysics I: Well Logging; Decomposition and particle motion of acoustic dipole log in anistrophic formation; Earth Resources Lab MIT.

J.O. Blanch et al., A Method to Extract Fast and Slow Shear Wave Velocities in an Anistropic Formation; SEG International Exposition and 72nd Annual Meeting, Oct. 11, 2002.

P. Carrion et al., "Source wavelet and its angular spectrum from plane–wave seismograms", geophysics, vol. 55, No. 8 (Aug. 1990), pp. 1026–2035.

Chuen Hon Cheng et al., "Elastic wave propagation in a fluid–filled borehole and synthetic acoustic logs", Geophysics, vol. 46, No. 7 (Jul. 1981), pp. 1042–1053.

L. Thomsen, Reflection seismology over azimuthally anisotropic media:, Geophysics, vol. 53, No. 3 (Mar. 1988), pp. 304–313.

"Semblance processing of borehole acoustic array data"; Kimball et al; GEOPHYSICS, vol. 49, No. 3 (Mar. 1984); pp. 274–281, 7 Figures.

"Multiple–shot processing of array sonic waveforms"; Hsu et al.; GEOPHYSICS, vol. 52, No. 10 (Oct. 1987); pp. 1376–1390, 13 Figures, 1 Table.

"Predictive processing of array acoustic waveform data"; Tang; GEOPHYSICS, vol. 62, No. 6 (Nov.–Dec. 1997); pp. 1710–1714, 4 Figures.

"A New Generation Crossed Dipole Logging Tool: Design and Case Histories"; Kessler et al.; SPE 71740; Society of Petroleum Engineers 2001 Annual Technical Conference and Exhibition, New Orleans, Louisiana, Sep. 30–Oct. 3, 2001; pp. 1–16.

* cited by examiner

ACOUSTIC LOGGING APPARATUS AND METHOD

CROSS-REFERENCE TO RELATED APPLICATIONS

This application is related to the following co-pending applications: Ser. No. 10/025,157 filed Dec. 19, 2001 Ser. No. 10/027,749 filed Dec. 21, 2001; and Ser. No. 10/677,698 filed Oct. 2, 2003.

STATEMENT REGARDING FEDERALLY SPONSORED RESEARCH OR DEVELOPMENT

Not applicable.

BACKGROUND OF THE INVENTION

1. Field of the Invention

The present invention relates generally to acoustic well logging. More particularly, the present invention relates to determining the velocity (slowness) of acoustic waves in an earth formation.

2. Description of the Related Art

In the art of acoustic logging, the formation properties of interest are one or more of the compressional wave velocity, the shear wave velocity and the Stonley wave velocity. These acoustic velocities are indicative of the formation's ability to hold and produce hydrocarbons. Operation of a typical acoustic formation tool may involve placing the tool in the well bore and firing one or more acoustic transmitters periodically, thus launching acoustic energy into the formation. The acoustic energy thus produced propagates along the formation wall in one or more propagation modes, e.g. compressional or shear wave modes. Receivers on the tool, spaced apart from the one or more transmitters, receive acoustic energy as the various waves move along the wall past the receivers. The amplitudes and arrival times of the various acoustic signals at the receivers are indicative of the velocity of the acoustic waves (or slowness, being the inverse of the velocity) within the formation.

Determining the acoustic velocity with early wireline acoustic logging tools involves an adaptation of data processing techniques used in seismic work. In particular, a method called semblance or coherence is used. U.S. Pat. No. 4,594,691 to Kimball et al. (hereinafter the '691 patent) is exemplary of related art wireline acoustic logging tools that use this semblance/coherence measure for determining acoustic velocities within the formation. As exemplified in the '691 patent, determining the acoustic velocity using a coherence calculation is just a determination of how much two or more received waveforms resemble one another. The semblance/coherence determination itself, however, is not at all concerned with actual formation properties; rather, the power of the semblance/coherence measure is running the calculation on portions of each received waveform that should correspond, given the slowness of the formation. Since the formation slowness is the parameter of interest, the semblance/coherence measure is run multiple times at multiple slowness values, and the slowness values where the waveforms show the best semblance/coherence are assumed to be the correct slowness values for the formation.

Although the semblance/coherence calculation method has been relatively successful, the oil and gas industry as a whole has been searching for different, better and more efficient ways to calculate acoustic velocity in earth formations. U.S. Pat. No. 5,541,890 to Tang (hereinafter the '890 patent) is exemplary of one such attempt. In particular, the '890 patent discloses that in the art of acoustic logging, any received signal may be synthesized by use of the other received signals. The '890 patent discloses synthesizing or estimating a received signal, and then comparing the synthesized signal to the actual received signal. For an array of possible slowness values, the '890 patent discloses creating an object function which is indicative of the difference between the synthesized received signal and the actual received signal. In the '890 patent, where that object function reaches a minimum (the difference between the synthesized signal and the actual signal are small), the values of the assumed slowness must match the actual formation slowness. Stated otherwise, the '890 patent records a series of waveforms at a plurality of receivers for each firing of the acoustic transmitter. The '890 patent then discloses synthesizing one received waveform from the remaining received waveforms, and comparing the synthesized received signal against the actual received signal.

A similar technique is disclosed in U.S. Pat. No. 5,081,611 to Hornby (hereinafter the '611 patent). The '611 patent discloses a method for determining slowness of an earth formation that involves calculating or estimating ray paths (ray tracing) and also estimating slowness values. The '611 patent discloses comparing the first arrivals (time of the first significant amplitude deflection in the received signal) predicted by the estimated ray path and slowness values to the actual first arrivals in each received signal. The patent discloses "back projecting" the error between the actual and calculated first arrivals (here again in the received signals) and running the process of estimating ray paths and slowness values again until the error is small, thus revealing the actual ray paths and formation slowness. Much like the '890 patent described above, the '611 patent is effectively estimating received signals, and comparing those estimated received signals to the actual received signals as part of determining slowness.

While semblance/coherence may create visually pleasing results, determining slowness in this matter is not suitable for error estimation. Techniques described in the '611 patent and the '890 patent disclosures may suffer from the same shortcomings. Consequently, an improved method to determine the velocity or slowness of the various propagation modes in an earth formation is desired.

SUMMARY OF SOME OF THE PREFERRED EMBODIMENTS

The preferred embodiments of the present invention are directed to a method for determining the acoustic velocity of the various propagation modes of acoustic waves in an earth formation by assuming a transfer function of the earth formation and using the assumed transfer function to estimate a source signal based on each received signal. Preferably, the estimated source signals are compared to reveal an objective function from which the acoustic slowness of the earth formation may be determined. Preferably this is done for a plurality of assumed transfer functions, and minimas of the objective function indicate the formation parameters of interest.

A first embodiment for comparing estimated source signals involves determining a variance of each of the estimated source signals against an average estimated source signal. This embodiment involves calculating an average of the estimated source signals, and then calculating a variance of the individual source signals against the average source signal. The variance values, which are the objective function in this case, may be plotted in such a way that the plot that looks similar to the time slowness plot used in semblance/coherence processing, but has two distinct advantages. First, the variance values have sharper transitions to the inflection points (minima in the preferred embodiments) than the semblance/coherence of the prior art, and therefore a more exact value of the slowness may be determined. Second, both of tie variance values themselves, and the curvature of the objective function at the minima, are indicative of the accuracy of the slowness determination. That is, a particular plot of information may reveal a slowness value, and also indicates the relative accuracy of the slowness determination.

The second embodiment for determining the slowness of the formation of the preferred embodiments involves comparing each estimated source signal with its immediate neighbor to determine a difference, and then summing the square of the differences to obtain a value of the objective function. The values of the objective function may likewise be plotted in a time slowness plot to reveal a graph similar to a semblance/coherence plot familiar to one of ordinary skill in the art. The advantage of this second embodiment is that the plotted objective function has slower transitions from maxima to minima such that the determination of the minima points (determining the slowness values) may be accomplished with less computational overhead. In other words, determining inflection points in objective functions created by the differential comparison is at least as computationally fast as traditional semblance/coherence processing. Also, the values of the objective function at the minima and/or the curvature of the objective function at the minima is indicative of the error in the slowness determination.

The disclosed device comprises a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a more detailed description of the preferred embodiments of the present invention, reference will now be made to the accompanying drawings, wherein.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Although there may be some distinction in the oil and gas industry between logging-while-drilling (LWD) and measuring-while-drilling (MWD), throughout this specification and claims the terms are considered equivalent and mean generally any device or devices that makes measurements downhole (whether of formation properties, borehole properties, or properties of the drill string) during the drilling, logging and monitoring process.

DETAILED DESCRIPTION OF PREFERRED EMBODIMENT

Figure 1:
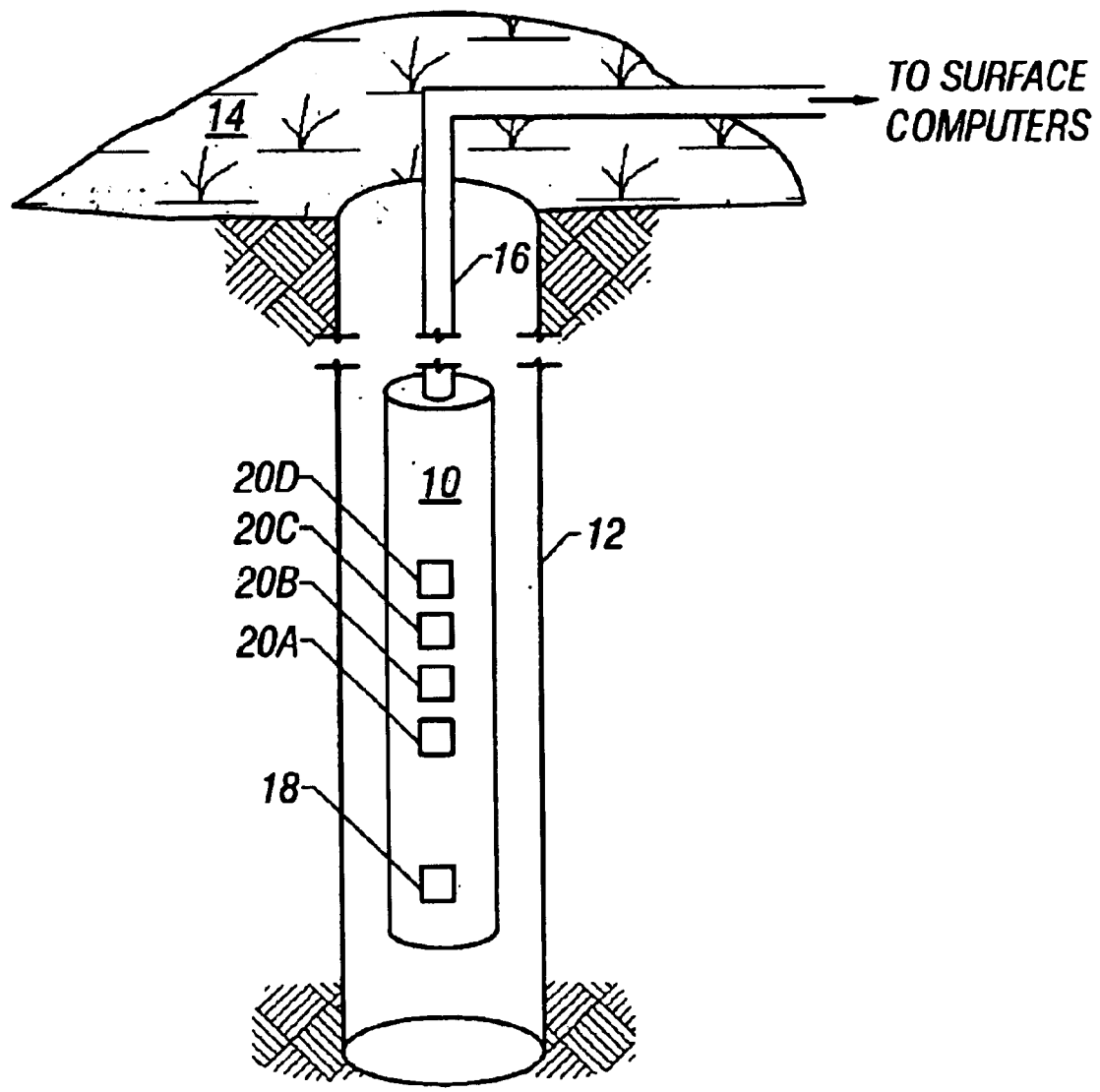
FIG. 1 shows a wireline logging tool of the preferred embodiment.

FIG. 1 shows an acoustic logging device 10 constructed in accordance with the preferred embodiments. In particular, FIG. 1 shows a tool 10 disposed within a fluid filled borehole 12 at some distance below the surface 14. The tool 10 is preferably suspended within the borehole by means of a multi-conductor armored cable 16, and the cable 16 preferably couples to a surface computer (not shown). The tool 10 preferably comprises an acoustic transmitter 18 and a plurality of receivers 20A-D spaced apart from the transmitter 18, and also from each other. Although the preferred embodiment comprises four receivers, any number of receivers may be used without departing from the spirit and scope of the invention.

Thus, the tool 10 of the preferred embodiment is a wireline device; however, the principles described herein may likewise be practiced in a measuring-while-drilling (MWD), logging-while-drilling (LWD) or any downhole measurement system. It must be understood that while the preferred embodiments of the present invention will be described in the context of a wireline device, the description in this manner should in no way be construed as limiting the general structures and processing methods disclosed herein to wireline devices.

Operation of the wireline tool 10 involves placing the tool within a borehole 12 and allowing the tool 10 to drop or otherwise move below a formation of interest. The tool 10 is then slowly raised within the borehole, and while being raised, the transmitter 18 periodically fires, inducing acoustic energy into the formation. As the acoustic energy propagates through the formation, each of the receivers 20A–D receives a portion of the acoustic energy and converts the acoustic energy into electrical signals. The amplitudes of the received acoustic energy, as well as the time it took the energy to propagate along the distance between the transmitter 18 and the receivers 20A–D, are indicative of characteristics of the formation of interest. Determining these characteristics involves analyzing the received signals to extract the information such as the acoustic velocity (or slowness, being the inverse of the velocity) of the various propagation modes such as the compressional wave, the shear wave or the Stonley wave. In the embodiment where tool 10 is a wireline device, surface computers (not shown) are responsible for extracting this information. In an embodiment where the transmitter 18 and receivers 20A–D are located on a LWD or MWD device, making these acoustic measurements while the drill bit cuts through earth formations, some or all of the data processing required to extract the desired information may be done downhole.

In broad terms, the processing method of the preferred embodiment comprises talking a plurality of received waveforms or received signals from tool 10, and calculating or estimating source signals or source wavelets based on each of the received signals by assuming a transfer function of the formation. The estimated source signal for each receiver or received signal is compared in some way with the other estimated source signals to create an objective function. For each set of received signals, this source estimation step is preferably performed multiple times, each time with a different assumed transfer function. Minimas of a graph of plotted objective function values are indicative of the slowness of the acoustic waves through the formation, and error of the calculation may be ascertained from the objective function graph as well.

Figure 2:
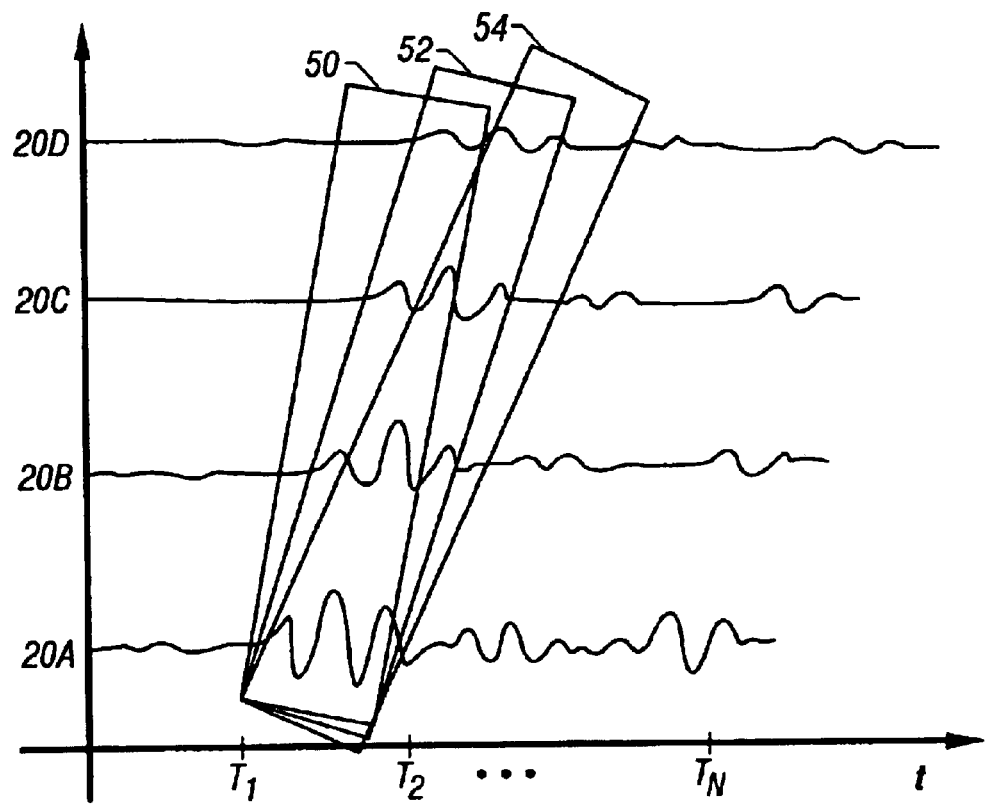
FIG. 2 shows an exemplary set of received signals as well as an exemplary set of time slices used in the preferred embodiments.

The source signal estimation will now be described in greater detail with reference to FIG. 2. FIG. 2 shows four received signals, 20A–D. Notice how the amplitude of the received signal of the closest receiver 20A is greater than the signal received by the more distant receivers, for example 20D, exemplifying attenuation of the acoustic signal as it propagates through the formation. Notice also how the waveforms shift out in time from the closest to the more distant receivers, exemplifying the finite speed of the acoustic waves within the formation. Determining the slowness of the formation in the preferred embodiments involves assuming a transfer function for the formation. Using the assumed transfer function, an estimated source signal or source wavelet for each received signal is calculated. Estimating each source wavelet can be described mathematically as follows:

$$S_{EST_i}(t) = [TF]^{-1} R_i(t) \quad (1)$$

where $S_{EST_i}$ is the estimated source signal calculated for the ith receiver, [TF] is the assumed transfer function of the formation for source to receiver propagation (and thus its inverse is used for estimating the source signal), $R_i$ is the ith receiver signal and t is time. For each received signal $R_i$, an estimate of the source signal $S_{EST_i}$ is created.

As the above discussion implies, a primary component of the source signal estimation is the assumed transfer function [TF]. The assumed transfer function may be relatively simple, taking into account only the finite speed at which the acoustic signals propagate, or may be very complex, to include estimations of attenuation of the transmitted signal in the formation, frequency component dispersion, paths of travel of the acoustic signals, and the many different propagation modes within the formation (e.g. compressional waves, shear waves, Stonely waves). If desired, the transfer function used can even model the effects of the acoustic waves crossing boundaries between different layers of earth formations. For reasons of simplicity of the calculation, the preferred estimated transfer functions take into account only the propagation speed (slowness) of the acoustic energy in the formation.

Figure 3:
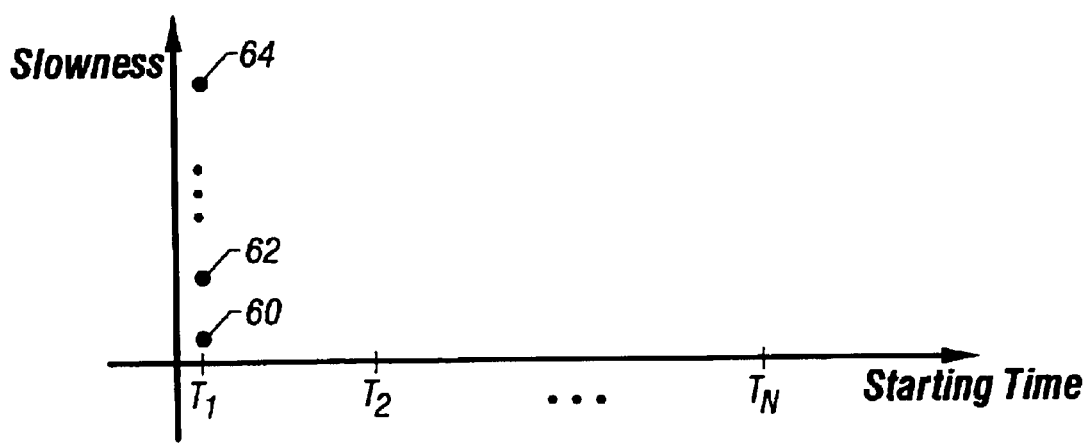
FIG. 3 shows an exemplary way to build a plot of the objective function in the preferred embodiments.

For a particular starting time, for example starting time $T_1$ in FIG. 2, and for a first assumed transfer function having an assumed slowness, portions of each received signal are identified as being related based on the transfer function. Stated another way, the portions of the received signals within the window or rectangular time slice 50 should correspond based on the slowness of the assumed transfer function. The time width of the samples taken from each of the received signals (roughly the horizontal width of the rectangular time slice 50) is preferably at least as long as the source signal. In this way, an entire source waveform or source wavelet may be estimated. However, the time width of the samples taken from the received signals need not necessarily be this width, as shorter and longer times would be operational. While the preferred embodiment is to window portions of each signal as shown in FIG. 3, and then estimate source signals for those portions of the waveforms within the window, windowing the received signals in this manner need not necessarily take place. It would be operable to estimate source signals using any portion of the received signals, and indeed each entire received waveform could be used to estimate a source signal, and this would still be within the contemplation of this invention.

Thus, preferably, portions of the received signals in the rectangular time slice 50 are each used to create an estimated source signal. The estimated source signals are compared to create an objective function that is indicative of their similarity. The process of assuming a transfer function, estimating source signals or source wavelets based on received signals, and creating an objective function is repeated a plurality of times for each starting time. The rectangular time slices 50, 52 and 54 are exemplary of multiple assumed transfer functions (each having a different assumed slowness) used in association with starting time $T_1$. Moreover, estimating source wavelets in this fashion (including multiple assumed transfer functions) is preferably repeated at a plurality of starting times within the received signals, represented in FIG. 2 as $T_1, T_2 \ldots T_N$.

The value of the objective function created for each assumed transfer function and starting time is preferably plotted in a graph as a function of the starting time and the slowness of assumed transfer function. As shown in FIG. 3, the starting time of the source signal estimations, $T_1, T_2 \ldots T_n$, are preferably the ordinate or X axis coordinate and the slowness is preferably the abscissa or Y axis. For example, the value of the objective function calculated using portions of received signals 20A–D within rectangular time slice 50 is plotted at point 60 in FIG. 4. Likewise, the value of the objective function calculated using portions of received signals 20A–D within rectangular time slice 52 is plotted at point 62, and the value of the objective function associated with the rectangular time slice 54 is shown at point 64. Thus, for each of a plurality of starting times, and for each starting time a plurality of slowness values associated with assumed transfer functions, a graph of the objective function is created. In the preferred embodiments, the value of the objective function plotted at each location is indicated by a color, with cooler colors (blues, purples) showing more similarity, and hotter colors (reds, oranges) showing less similarity of the estimated source signals or source wavelets. The color schemes however are only exemplary and other schemes may be used without departing from the scope and spirit of the invention.

While comparing estimated source signals to obtain the objective function could take many forms, two embodiments will now be described—determining a variance of the estimated source signals, and summing a square of a difference of consecutive estimated source signals.

Calculating the objective function of a first embodiment involves determining a variance of the estimated source signals. In broad terms, this embodiment involves calculating an average of the estimated source signals, and then calculating a variance using the average of the estimated source signals. In more mathematical terms, for each assumed transfer function, a series of estimated source waveforms or signals $S_{EST_i}$ are calculated using equation (1) above. From the estimated source signals, an average estimated source signal is preferably calculated as follows:

$$S_{EST_{AVG}}(t) = \frac{1}{N} \sum_{i=1}^{N} S_{EST_i}(t) \qquad (2)$$

where $S_{EST_{AVG}}$ is the average estimated source signal, N is the number of received signals, $S_{EST_i}$ is the source wavelet estimated for each received signal within the time slice, and t is time.

The average estimated source signal is used to calculate a value representing the variance of the estimated source signals from the average estimated source signal. The variance is preferably calculated as follows:

$$\delta^2 = \sum_{i=1}^{N} (S_{EST_i}(t) - S_{EST_{AVG}}(t))^2 \qquad (3)$$

where $\delta^2$ is the variance. In this embodiment, the variance value is the objective function plotted in the slowness versus starting time graph (FIG. 3). Large values of the variance indicate that the assumed transfer function (and its associated assumed slowness) did not significantly match the actual formation properties. Likewise, small values of the variance indicate that the assumed transfer function (and its associated assumed slowness) closely matched the actual formation properties. Thus, minimas of the objective function in the plot indicate the slowness of the formation, and the value of the objective function at those minimas is proportional to the error of the calculation.

A second embodiment for calculating an objective function is based on determining a difference between each estimated source signal. In particular, and referring again to FIG. 2, consider the portions of the received signals within rectangular time slice 50 associating with starting time $T_1$. As discussed above, using the assumed transfer function, an estimated source signal is created using the portions of the received signal within the time slice 50. In this embodiment, differences or differentials are calculated between each estimated source signal, for example between the source signal estimated from a portion of the 20A signal and the source signal estimated from the portion of the 20B signal. This difference is preferably calculated between each succeeding estimated source signal, and the objective function in this embodiment is the sum of the square of each difference calculation. Much like plotting the variance objective function, this differential objective function is preferably plotted as a function of slowness and starting time, as shown in FIG. 3. However, the graph obtained using the differential slowness calculation has slower transitions from maximas to minimas, which therefore makes determining the minima (indicative of the actual slowness of the formation) easier than in cases where the graph has relatively steep slopes between minima and maxima. More mathematically, the objective function of this second embodiment is calculated as follows:

$$\zeta = \sum_{i=1}^{N-1} (S_{EST_{i+1}} - S_{EST_i})^2 \qquad (4)$$

where $\zeta$ is the objective function, and N is the number of received signals. Much like using the variance as the objective function, this differential objective function is preferably plotted in a slowness versus starting time graph with cooler colors representing less difference between received signals, and hotter colors representing greater differences. Known techniques may be used to determine minima of these graphs, and these minima are indicative of actual formation slowness.

Figure 4:
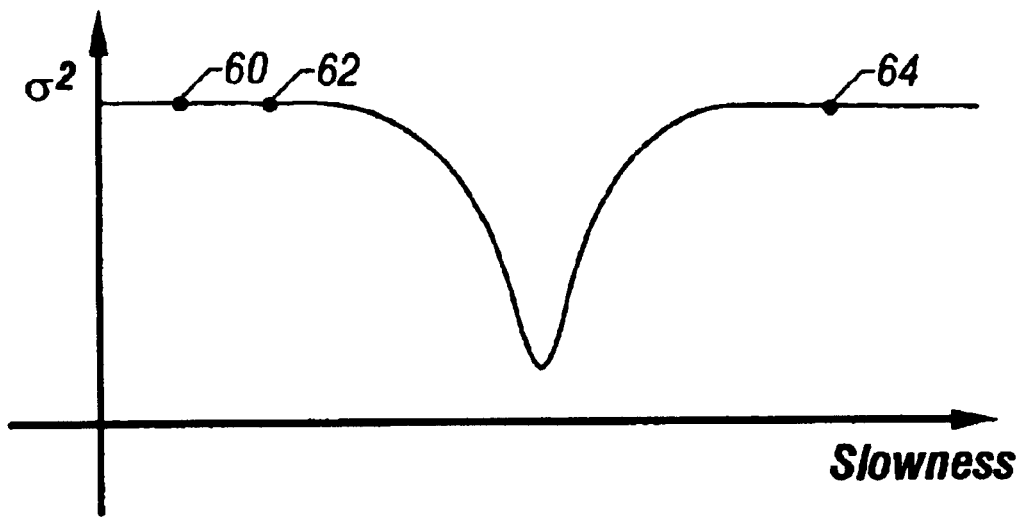
FIG. 4 shows an exemplary plot of a variance objective function at a single starting time.
Figure 5:
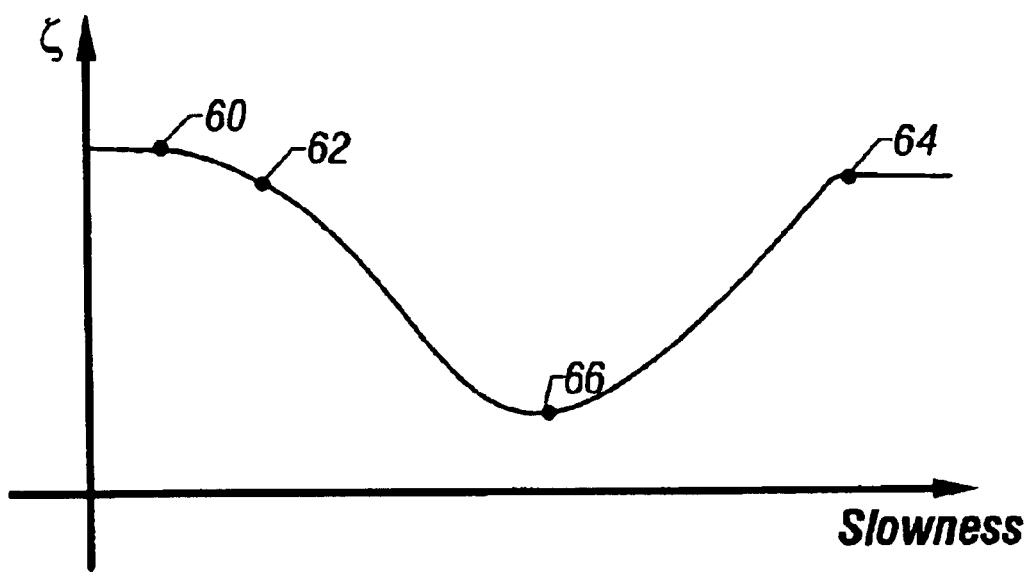
FIG. 5 shows an exemplary plot of a differential objective function at a single starting time.

Referring now to FIGS. 4 and 5, there is shown exemplary plots of the two exemplary objective functions described in this specification. In particular, FIG. 4 is an exemplary plot of the variance objective function against slowness. FIG. 5 is an exemplary plot of the differential objective function against slowness. For purposes of illustration, consider that the variance value objective function plot of FIG. 4 and the differential objective function plot of FIG. 5 are based on the same set of estimated source waveforms. Each of the plots of FIGS. 4 and 5 could be, for example and without limitation, the values of an objective function for multiple assumed transfer functions along a single starting time. Referring briefly to FIG. 3, the plots of FIGS. 4 and 5 could be the exemplary point 60, 62 through 64 associated with starting time $T_1$ for the two methods of calculating the objective function of the preferred embodiments.

Each of the objective function embodiments represented by the exemplary plots in FIGS. 4 and 5, have particular advantages. With reference briefly to the variance objective function of FIG. 4, it has been described that the slowness of the formation may be determined by finding minimas of the objective function plot. Searching for minimas is typically done by computer programs. Computer programs, however, do not have the ability to see general trends in plotted information as does a human eye. In particular, a computer program searching for a minima in the variance objective function in the exemplary plot of FIG. 4 cannot tell, comparing point 60 and 62, how close these points are to the minima of the plotted function. However, and referring to FIG. 5, comparing points 60 and 62 of the differential objective function embodiment, a computer program can easily tell the direction and relative proximity of the minima. Thus, determining slowness in an embodiment using a differential objective function is faster than making the same determination in a variance objective function plot. Indeed, determining the minimas in a differential objective function plot rivals in computational speed the determination of standard semblance/coherence. Moreover, both the value of the objective function at the minima, for example point 66 in FIG. 5, and the curvature of the plot of the objective function at point 66, are related to the error in the slowness determination.

Computationally, determining the minima in the variance objective value system, such as that exemplified in FIG. 4, is more difficult than in the differential objective function embodiment. However, the variance objective value embodiment has many advantages that outweigh any computational overhead required to find the minima (and therefore the slowness within the time slowness plot). In particular, and as exemplified in FIGS. 4 and 5, the variance objective value embodiment has significantly sharper transitions from maxima to minima, which allow determinations of the formation slowness to be made more precisely than the differential objective function embodiment, and also more precisely than standard semblance/coherence. Further, both the value of the variance objective function at the minima as well as the curvature of the plot near that point are directly related to the error in the slowness determination. That is, a minima of a variance objective function values indicates by its location in the plot the slowness of the formation, but also the value itself shows the error. This error may also be determined as the second derivative of a function that describes the variance objective value near the minima.

Numerous variations and modifications will become apparent to those skilled in the art once the above disclosure is fully appreciated. For example, the disclosed method for determining acoustic wave velocity and orientation may be implemented using any number of receiver levels and different receiver types for the acoustic logging tool. Throughout this discussion, the various earth formation characteristics were discussed with reference to finding minimas of the objective function; however, one of ordinary skill in the art could easily invert the values used, thus making a determination a search for maximum values in the plot, and this would be within the contemplation of the invention. Moreover, the two disclosed embodiments for finding the slowness need not be mutually exclusive—using both calculation methods in a single tool may be advantageous. Further, neither embodiment is preferred over the other. If the signal processing is taking place downhole, such as in a MWD or LWD system, the differential objective value method may be more advantageous. By contrast, if the tool of interest is a wireline tool, where computer speeds and memory size is of little concern, then the variance objective function may be more advantageous. It is noted, however, that either method may be implemented in either a wireline or MWD/LWD tool, and this would still be within the contemplation of this invention. With regard to the differential objective function embodiment, calculating the objective function may equivalently be made by taking the absolute value of the difference, rather than the square. It is intended that the following claims be interpreted to embrace all such variations and modifications.

What is claimed is:

1. A method of determining characteristics of an earth formation traversed by a borehole, the method comprising:
    transmitting acoustic energy into the earth formation from within the borehole;
    receiving at least some of the acoustic energy to create a plurality of received waveforms;
    estimating source waveforms from the received waveforms to create estimated source waveforms; and
    comparing the estimated source waveforms to determine a characteristic of the earth formation.

2. The method of determining characteristics of an earth formation traversed by a borehole as defined in claim 1 wherein transmitting acoustic energy into the earth formation from within the borehole further comprises transmitting acoustic energy from an acoustic source mounted on a tool disposed within the borehole.

3. The method of determining characteristics of an earth formation traversed by a borehole as defined in claim 2 wherein transmitting acoustic energy from an acoustic source mounted on a tool disposed within the borehole further comprises transmitting acoustic energy from an acoustic source mounted on a wireline logging tool.

4. The method of determining characteristics of an earth formation traversed by a borehole as defined in claim 2 wherein transmitting acoustic energy from an acoustic source mounted on a tool disposed within the borehole further comprises transmitting acoustic energy from an acoustic source mounted on a logging while drilling tool.

5. The method of determining characteristics of an earth formation traversed by a borehole as defined in claim 1 wherein receiving at least some of the acoustic energy to create a plurality of received waveforms further comprises:
    receiving acoustic energy at a first receiver mounted on a tool disposed within the borehole to create a first received waveform; and
    receiving acoustic energy at a second receiver mounted on the tool disposed within the borehole to create a second received waveform.

6. The method of determining characteristics of an earth formation traversed by a borehole as defined in claim 5 wherein receiving acoustic energy at the first and second receiver mounted on the tool further comprises receiving acoustic energy at the first and second receivers mounted on a wireline logging tool.

7. The method of determining characteristics of an earth formation traversed by a borehole as defined in claim 5 wherein receiving acoustic energy at the first and second receiver mounted on the tool further comprises receiving acoustic energy at the first and second receivers mounted on a logging while drilling tool.

8. The method of determining characteristics of an earth formation traversed by a borehole as defined in claim 1 wherein estimating source waveforms from the received waveforms to create estimated source waveforms further comprises:
    estimating a transfer function of the earth formation; and
    applying each of the plurality of received waveforms to the inverse transfer function to create the estimated source waveforms.

9. The method of determining characteristics of an earth formation traversed by a borehole as defined in claim 8 wherein estimating a transfer function of the earth formation further comprises estimating a slowness of the formation of the acoustic energy.

10. The method of determining characteristics of an earth formation traversed by a borehole as defined in claim 9 wherein estimating a transfer function of the earth formation further comprises estimating an attenuation experienced by the acoustic energy through the formation.

11. The method of determining characteristics of an earth formation traversed by a borehole as defined in claim 1 wherein comparing the estimated source waveforms to each other to determine a characteristic of the earth formation further comprises determining a value of an objective function based on the estimated source waveforms.

12. The method of determining characteristics of an earth formation traversed by a borehole as defined in claim 11 wherein determining a value of an objective function based on the estimated source waveforms further comprises determining a variance value of the estimated source waveforms.

13. The method of determining characteristics of an earth formation traversed by a borehole as defined in claim 12 wherein determining a variance value of the estimated source waveforms further comprises calculating the variance value using substantially the following equations:

$$\delta^2 = \sum_{i=1}^{N} (S_{EST_i}(t) - S_{EST_{AVG}}(t))^2$$

where $\delta^2$ is the variance value, $S_{EST_i}$ is a source waveform estimated for each received waveform, $S_{EST_{AVG}}$ is the average estimated source waveform calculated using substantially the following equation:

$$S_{EST_{AVG}}(t) = \frac{1}{N} \sum_{i=1}^{N} S_{EST_i}(t)$$

where N is the number of received waveforms, and t is time.

14. The method of determining characteristics of an earth formation traversed by a borehole as defined in claim 13 wherein comparing the estimated source waveforms to each other to determine a characteristic of the earth formation further comprises:

repeating the estimating source waveforms step, and for each set of estimated source waveforms, calculating the variance value; and plotting each variance value as a function of a starting time and an estimated slowness in an assumed transfer function.

15. The method of determining characteristics of an earth formation traversed by a borehole as defined in claim 14 further comprising determining the characteristic of the earth formation by searching for minimas of the plot of the variance values.

16. The method of determining characteristics of an earth formation traversed by a borehole as defined in claim 15 further comprising estimating an error in the determination of the characteristic of the earth formation based on the variance value at the minima.

17. The method of determining characteristics of an earth formation traversed by a borehole as defined in claim 15 further comprising estimating an error in the determination of the characteristic of the earth formation based on a curvature of the plot at the minima.

18. The method of determining characteristics of an earth formation traversed by a borehole as defined in claim 11 wherein determining a value of an objective function based on the estimated source waveforms further comprises calculating the value of the objective function by summing a difference between each successive estimated source waveform.

19. The method of determining characteristics of an earth formation traversed by a borehole as defined in claim 18 wherein calculating the value of the objective function by summing a difference between each successive estimated source waveform further comprises application of substantially the following equation:

$$\zeta = \sum_{i=1}^{N-1} (S_{EST_{i+1}} - S_{EST_i})^2$$

where $\zeta$ is the value of the objective function, $S_{EST_i}$ is a source waveform estimated for each received waveform, and N is the number of received waveforms.

20. The method of determining characteristics of an earth formation traversed by a borehole as defined in claim 19 wherein comparing the estimated source waveforms to each other to determine characteristics of the earth formation further comprises:

repeating the estimating source waveforms step, and for each set of estimated source waveforms, calculating the value of the objective function; and, plotting the values of the objective function as a function of starting time and estimated slowness in the assumed transfer function.

21. The method of determining characteristics of an earth formation traversed by a borehole as defined in claim 20 further comprising determining the characteristic of the earth formation by searching for minimas of the plot of the objective function values.

22. The method of determining characteristics of an earth formation traversed by a borehole as defined in claim 21 further comprising estimating an error in the determination of the characteristic of the earth formation based a curvature of the objective value plot at the minima.

23. A method of operating a tool disposed within a borehole traversing an earth formation, the method comprising:

directing acoustic energy into the formation;

generating received waveforms responsive to the acoustic energy as it propagates in the formation;

estimating source waveforms based on the received waveforms; and comparing the estimated source waveforms to determine acoustic velocity of the earth formation.

24. The method of operating a tool disposed within a borehole traversing an earth formation as defined in claim 23 wherein comparing the estimated source waveforms to determine acoustic velocity of the earth formation further comprises:

calculating an objective function based on the estimated source waveforms; and determining the acoustic velocity of the earth formation based on a plot containing the objective function.

25. The method of operating a tool disposed within a borehole traversing an earth formation as defined in claim 24 wherein calculating an objective function based on the estimated source waveforms further comprises:

averaging the estimated source waveforms to determine an average estimated source waveform; and determining a variance value of the estimated source waveforms using the average estimated source waveform, the variance value being the objective function.

26. The method of operating a tool disposed within a borehole traversing an earth formation as defined in claim 25 wherein averaging the estimated source waveforms to determine an average estimated source waveform further comprises determining the average estimated source waveform using substantially the following equation:

$$S_{EST_{AVG}}(t) = \frac{1}{N} \sum_{i=1}^{N} S_{EST_i}(t)$$

where $S_{EST_{AVG}}$ is the average estimated source waveform, N is the number received waveforms, $S_{EST_i}$ is the estimated source received waveform, and t is time.

27. The method of operating a tool disposed within a borehole traversing an earth formation as defined in claim 26 wherein determining a variance value of the estimated source waveforms using the average estimated source waveform further comprises calculating the variance value using substantially the following equation:

$$\delta^2 = \sum_{i=1}^{N} (S_{EST_i}(t) - S_{EST_{AVG}}(t))^2$$

where $\delta^2$ is the variance, $S_{EST_{AVG}}$ is the average estimated source waveform, N is the number of received waveforms, $S_{EST_i}$ is the estimated source received waveform, and t is time.

28. The method of operating a tool disposed within a borehole traversing an earth formation as defined in claim 25 further comprising:

plotting multiple variance values calculated for multiple sets of estimated source waveforms to create a plot; and determining inflection points of the variance values within the plot as indicative of acoustic velocity within the earth formation.

29. The method of operating a tool disposed within a borehole traversing an earth formation as defined in claim 28 wherein comparing the estimated source waveforms to determine the acoustic velocity further comprises finding locations in the plot where the inflection points are minimas.

30. The method of operating a tool disposed within a borehole traversing an earth formation as defined in claim 29 wherein comparing the estimated source waveforms to determine the acoustic velocity further comprises determining an error in the acoustic velocity determination proportional to the value of the objective function at the minimas.

31. The method of operating a tool disposed within a borehole traversing an earth formation as defined in claim 24 wherein calculating an objective function based on the estimated source waveforms further comprises calculating a differential objective function using substantially the following equation:

$$\zeta = \sum_{i=1}^{N-1} (S_{EST_{i+1}} - S_{EST_i})^2$$

where $\zeta$ is the differential objective function, and N is the number of received waveforms, and $S_{EST_i}$ is the estimated source waveform for each received waveform.

32. The method of operating a tool disposed within a borehole traversing an earth formation as defined in claim 31 wherein comparing the estimated source waveforms to determine the acoustic velocity further comprises:
plotting multiple values of the differential objective function calculated for multiple sets of estimated source waveforms to obtain a plot; and
determining inflection points of the values of the differential objective function within the plot as indicative of acoustic velocity within the earth formation.

33. The method of operating a tool disposed within a borehole traversing an earth formation as defined in claim 32 wherein comparing the estimated source waveforms to determine the acoustic velocity further comprises finding locations in the plot where the inflection points are minimas.

34. The method of operating a tool disposed within a borehole traversing an earth formation as defined in claim 23 directing acoustic energy into the formation further comprises directing acoustic energy into the formation from a wireline logging tool.

35. The method of operating a tool disposed within a borehole traversing an earth formation as defined in claim 23 directing acoustic energy into the formation further comprises directing acoustic energy into the formation from a logging while drilling tool.

36. In a system with a logging tool disposed within a borehole, the borehole traversing an earth formation, and with the logging tool having a transmitter and a plurality of receivers spaced apart from the transmitter and from each other, a method of determining a characteristic of the earth formation comprising:
transmitting acoustic signals into the earth formation with the transmitter;
receiving the acoustic signals with the plurality of receivers to create receiver signals;
estimating a source wavelet for each of the plurality of receiver signals to create a plurality of estimated source wavelets; and
determining acoustic velocity of the earth formation by comparison of the plurality of estimated source wavelets to each other.

37. The method of determining a characteristic of the earth formation as defined in claim 36 wherein estimating a source wavelet for each of the plurality of receiver signals to create a plurality of estimated source wavelets further comprises:
estimating a transfer function of the formation; and
calculating the estimated source signals by applying the inverse transfer function to each of the receiver signals.

38. The method of determining a characteristic of the earth formation as defined in claim 37 wherein determining acoustic velocity of the earth formation by comparison of the plurality of estimated source wavelets further comprises calculating an objective function based on the plurality of estimated source wavelets.

39. The method of determining a characteristic of the earth formation as defined in claim 38 wherein calculating an objective function based on the plurality of estimated source wavelets further comprises determining a variance of the estimated source wavelets.

40. The method of determining a characteristic of the earth formation as defined in claim 39 wherein determining a variance value or the estimated source wavelets further comprises calculating the variance value using substantially the following equations:

$$\delta^2 = \sum_{i=1}^{N} (S_{EST_i}(t) - S_{EST_{AVG}}(t))^2$$

where $\delta^2$ is the variance value, $S_{EST_i}$ is the estimated source wavelet for each receiver waveform, $S_{EST_{AVG}}$ is an average estimated source wavelet calculated using substantially the following equation:

$$S_{EST_{AVG}}(t) = \frac{1}{N} \sum_{i=1}^{N} S_{EST_i}(t)$$

where N is the number of receiver signals, and t is time

41. The method of determining a characteristic of the earth formation as defined in claim 40 wherein determining acoustic velocity of the earth formation by comparison of the plurality of estimated source wavelets further comprises:
repeating the estimating source wavelets step, and for each set of estimated source wavelets, calculating the variance value; and
plotting each variance value at least as a function of slowness to create a variance value plot.

42. The method of determining a characteristic of the earth formation as defined in claim 41 further comprising determining the characteristic of the earth formation by searching for minimas of the variance value plot.

43. The method of determining a characteristic of the earth formation as defined in claim 42 further comprising estimating an error in the determination of the characteristic of the earth formation based on a curvature of the variance value plot at the minima.

44. The method of determining a characteristic of the earth formations as defined in claim 43 wherein receiving acoustic signals with the plurality of receivers to create receiver signals further comprises receiving the acoustic signals on a wireline logging tool.

45. The method of determining a characteristic of the earth formations as defined in claim 43 wherein receiving acoustic signals with the plurality of receivers to create receiver signals further comprises receiving the acoustic signals on a logging while drilling tool.

46. The method of determining a characteristic of the earth formation as defined in claim 38 wherein calculating an objective function based on the plurality of estimated source wavelets further comprises calculating a difference between estimated source wavelets.

47. The method of determining a characteristic of the earth formation as defined in claim 46 wherein calculating a difference between estimated source wavelets further comprises use of substantially the following equation:

$$\zeta = \sum_{i=1}^{N-1} (S_{EST_{i+1}} - S_{EST_i})^2$$

where $\zeta$ is a value of the objective function, $S_{EST_i}$ is the estimated source wavelet for each receiver signal, and N is the number of receiver signals.

48. The method of determining a characteristic of the earth formation as defined in claim 47 wherein determining acoustic velocity of the earth formation by comparison of the plurality of estimated source wavelets further comprises:
repeating the estimating source wavelets step, and for each set of estimated source wavelets, calculating the value of the objective function; and
plotting the values of the objective function at least as a function of slowness to create a differential value plot.

49. The method of determining a characteristic of the earth formation as defined in claim 48 further comprising determining the characteristic of the earth formation by searching for minimas of the differential value plot.

50. The method of determining a characteristic of the earth formation as defined in claim 49 further comprising estimating an error in the determination of the characteristic of the earth formation based a curvature of the differential value plot at the minima.

51. The method of determining a characteristic of the earth formations as defined in claim 50 wherein receiving acoustic signals with the plurality of receivers to create receiver signals further comprises receiving the acoustic signals on a wireline logging tool.

52. The method of determining a characteristic of the earth formations as defined in claim 50 wherein receiving acoustic signals with the plurality of receivers to create receiver signals further comprises receiving the acoustic signals on a logging while drilling tool.

53. A method of determining slowness of an earth formation comprising:
a) generating acoustic signals with a transmitter mounted on a tool disposed within a borehole traversing the earth formation;
b) receiving at a first receiver mounted on the tool acoustic energy to create a first receiver signal;
c) receiving at a second receiver mounted on the tool acoustic energy to create a second receiver signal;
d) estimating a transfer function that comprises an assumed slowness of the earth formation;
e) calculating a first source wavelet using the first receiver signal and the estimated transfer function, the calculating beginning at a time based on a start time;
f) calculating a second source wavelet using the second receiver signal and the estimated transfer function, the calculating beginning at a time based on the start time;
g) comparing the first and second source wavelets to obtain an objective function;
h) plotting the objective function as a function of slowness of the assumed transfer function on a first axis and the start time of steps e) and f) on a second axis;
i) repeating steps d) through h) for a plurality of assumed transfer functions;
j) repeating steps d) through i) for a plurality of start times;
k) finding inflection points in the plot of the objective function, where the location of the inflection points on the first axis indicate the formation slowness.

54. The method of determining slowness of an earth formation as defined in claim 53 wherein comparing the first and second source wavelets to obtain an objective function further comprises:
calculating an average estimated source wavelet; and
calculating a variance using the first and second source wavelets and the average estimated source wavelet.

55. The method of determining slowness of an earth formation as defined in claim 54 wherein calculating the average estimated source wavelet further comprises calculating the average estimated source wavelet using substantially the following equation:

$$S_{EST_{AVG}}(t) = \frac{1}{N}\sum_{i=1}^{N} S_{EST_i}(t)$$

where $S_{EST_{AVG}}$ is the average estimated source wavelet, N is the number of calculated source wavelets, $S_{EST_i}$ is the source wavelets, and t is time.

56. The method of determining slowness of an earth formation as defined in claim 55 wherein calculating a variance using the first and second source wavelets and the average estimated source wavelet further comprises calculating the variance using substantially the following equation:

$$\delta^2 = \sum_{i=1}^{N} (S_{EST_i}(t) - S_{EST_{AVG}}(t))^2$$

where $\delta^2$ is the variance.

57. The method of determining slowness of an earth formation as defined in claim 53 wherein comparing the first and second source wavelets to obtain an objective function further comprises determining a difference between the source wavelets as the objective function.

58. The method of determining slowness of an earth formation as defined in claim 57 wherein determining a difference between the source wavelets further comprises calculating an objective function using substantially the following equation:

$$\zeta = \sum_{i=1}^{N-1} (S_{EST_{i+1}} - S_{EST_i})^2$$

where $\zeta$ is the objective function, $S_{EST_i}$ is the source wavelets, and N is the number of calculated source wavelets.

* * * * *